United States Patent [19]

Kim

[11] Patent Number: 5,568,911
[45] Date of Patent: Oct. 29, 1996

[54] DRAINAGE VALVE ACTUATOR MECHANISM

[75] Inventor: Jin D. Kim, Ansan, Rep. of Korea

[73] Assignee: Samsung Electronics Co., Ltd., Suwon, Rep. of Korea

[21] Appl. No.: 491,721

[22] Filed: Jun. 19, 1995

[30]     Foreign Application Priority Data

Jul. 7, 1994 [KR] Rep. of Korea ................. 1994-16227

[51] Int. Cl.$^6$ ................................................ F16K 31/04
[52] U.S. Cl. ..................... 251/129.12; 251/294; 68/208
[58] Field of Search .................... 251/129.11, 129.12, 251/58, 294; 68/208

[56]         References Cited

U.S. PATENT DOCUMENTS

| | | | |
|---|---|---|---|
| 3,484,075 | 12/1969 | Weekley | 251/129.12 |
| 3,955,792 | 5/1976 | Cho | 251/129.11 |
| 4,741,508 | 5/1988 | Fukamachi | 251/129.12 |

FOREIGN PATENT DOCUMENTS

| | | | |
|---|---|---|---|
| 1-55035 | 11/1989 | Japan | 68/208 |
| 5-23490 | 2/1993 | Japan | 68/208 |
| 5-57091 | 3/1993 | Japan | 68/208 |

*Primary Examiner*—James Larson
*Attorney, Agent, or Firm*—Burns, Doane, Swecker & Mathis, L.L.P.

[57]         ABSTRACT

A clothes washing machine includes a water drain having a motor-actuated valve. The motor drives first and second rotatable members in a common first direction until the second rotatable member reaches a drain-opening position for actuating a drain-opening mechanism to open the drain valve. Simultaneously, an electric switch is operated to temporarily de-energize the motor in order to keep the valve open for a predetermined period. After the motor restarts (i.e., once the draining has been completed) the first and second motors are again rotated in the common first direction until a cam on the second rotatable member engages a fixed cam. The cam on the second rotatable member rides on the fixed cam to disengage the second movable member for rotation relative to the first rotatable member in a second direction to reclose the drain valve.

8 Claims, 6 Drawing Sheets

5,568,911

DRAINAGE VALVE ACTUATOR MECHANISM

BACKGROUND OF THE INVENTION

This invention relates to a drainage apparatus of a clothes washing machine, and more particularly to a drainage apparatus of a clothes washing machine which is comprised of simple structural components in lieu of a solenoid coil.

A conventional washing machine, shown in FIG. 5, comprises a body 1 in which a water container 2, a dehydrating spin basket 3 and a pulsator 4 are provided. Under the water container 2 there is a power transmitting means 5 in which the power generated by a motor 6 is selectively transmitted to the dehydrating spin basket 3 and the pulsator 4 by a clutch lever 9.

Connected to the lower portion of the water container 2 a hose 7 is provided for draining the washing water in the water container 2, and a drainage valve 8 having an elastic member is provided for closing/opening the hose 7. A drain motor member 10 is mounted adjacent to the drainage valve 8 in a predetermined space for controlling the operation of the clutch lever 9 and the drainage valve 8. A wire 8b is further provided for connecting the clutch lever 9 and the drainage valve 8.

The drain motor member 10 of the prior art drainage apparatus, shown in FIGS. 6, 7A and 7B, comprises a couple of reduction assemblies "A", "B" which are comprised of a plurality of gears for transmitting the power of a motor 11 to a pulley 17. For interconnecting the reduction gear assemblies "A", "B" a clutch gear 12a is installed. At the lower portion of the clutch gear 12a a protuberance 19a is formed, and a groove 19b is provided in a wall of a gear A1 of the reduction gear assembly "A", which groove corresponds to the protuberance 19a for selectively fitting with the protuberance 19a. Moreover, a spring 18 is placed between the protuberance 19a and the groove 19b for biasing upwardly the clutch gear 12a at all times.

Further, a solenoid 13 is provided at the upper portion of the clutch gear 12a. When electricity is applied to the solenoid 13, a rod 13a of the solenoid 13 pushes downwardly the clutch gear 12a to connect the reduction gear assembly "A" with the reduction gear assembly "B", and the rotation force of the motor 11 is transmitted to the reduction gear assembly "B".

The reduction gear assembly "B" comprises a driven shaft 14 for transferring the rotation force of the motor 11 to the pulley 17, and an interrupting cam 15 provided on an intermediated portion of the driven shaft 14. Adjacent the circumference of the cam 15 a first switch lead 16a and a second switch lead 16b are provided to be actuated by the cam 15 for controlling the operation of the motor 11. The cam 15 further comprises a groove 15a for closing/opening the points between the first and the second leads 16a, 16b, selectively. The pulley 17 disposed at one end of the shaft 14 is connected to the wire 8b for the closing/opening of the drainage valve 8.

The drainage apparatus having the construction as described above, is operated as follows. As the washing cycle is switched into the drainage mode, electricity is applied to the motor 11, and simultaneously to the solenoid 13. The motor 11 drives the reduction gear assembly "A" connected to the motor 11. At the same time, the solenoid 13 pushes the rod 13A down. Upon the downward movement of the clutch gear 12a, the protuberance 19a is fitted in the groove 19b so that the rotation force of the reduction gear assembly "A" is transferred to the reduction gear assembly "B". The delivered force to the reduction gear assembly "B" is transferred to the pulley 17 through the driven shaft 14. The pulley 17 rotates and pulls the wire 8b a predecided length so as to open the drainage valve 8.

Upon the rotation of the pulley 17, the groove 15a of the cam 15 rotates. The free tip of the second switch lead 16b slides into the groove 15a so that the operation of the motor 11 comes to rest (FIG. 7B). However, since electricity is still applied to the solenoid 13, the rod 13a of the solenoid 13 stays in the pushed position toward the clutch gear 12a. Since the reduction gear assemblies "A", "B" are engaged with each other, but at a standstill, the wire 8b is still in tension.

Finishing the drainage mode, electricity applied to the solenoid 13 is cut off so the clutch gear 12a is moved upward by the compressed spring 18. Thus, the connection between the reduction gear assemblies "A", "B" is disengaged. The pulley 17 connected to the reduction gear assembly "B" is free of the force of the motor 11. The wire 8b connected to the pulley 17 is returned to an initial position by the elastic force of an elastic member (not shown) housed in the valve 8. Simultaneously, the cam 15 is rotated in a reverse direction so that the first and the second leads 16a, 16b contact each other (FIG. 7A). That is, the switches 16a, 16b also are returned to the initial position.

However, since electricity, in the prior art drainage apparatus, is always supplied to the solenoid when in the drainage mode, a cut-off of the wire of the solenoid may occur due to heat generated by the coil resistance of the solenoid. Thus, the drainage apparatus malfunctions.

SUMMARY OF THE INVENTION

An object of the present invention is to provide a drainage apparatus of a clothes washing machine which is comprised of simple constructive mechanical components, and minimizing the number of components having low reliability, so that high reliability and lower cost of the drainage apparatus can be achieved.

In accordance with the advantageous features of the present invention, the drainage apparatus of a clothes washing machine comprises a shaft rotating in a first direction by a drain motor;

a first rotating member rotating in the same direction with respect to the rotation of the shaft; a second rotating member rotating in the same or reverse direction with respect to the rotation of the first rotating member; a force applying member to connect the first and the second rotating members when in normal position; a disconnecting member to disconnect the connection of the second rotating member with the first rotating member against the pushing of the force applying member; a two point switch making selectively a contact according to the rotation of the second rotating member; and a wire which is pulled to open a drain pipe against the resilient force of resilient member of a drain valve according to the first directional rotation of the second member, and is pulled by the resilient force of the resilient member and makes the rotation of the second member in the reverse direction to the first direction when disconnected the second member from the first member.

Further, the two point switch can switch between a first point and second point of the two point switch according to the rotation of the second rotating member.

DETAILED DESCRIPTION OF THE PREFERRED EMBODIMENT

Figure 1:
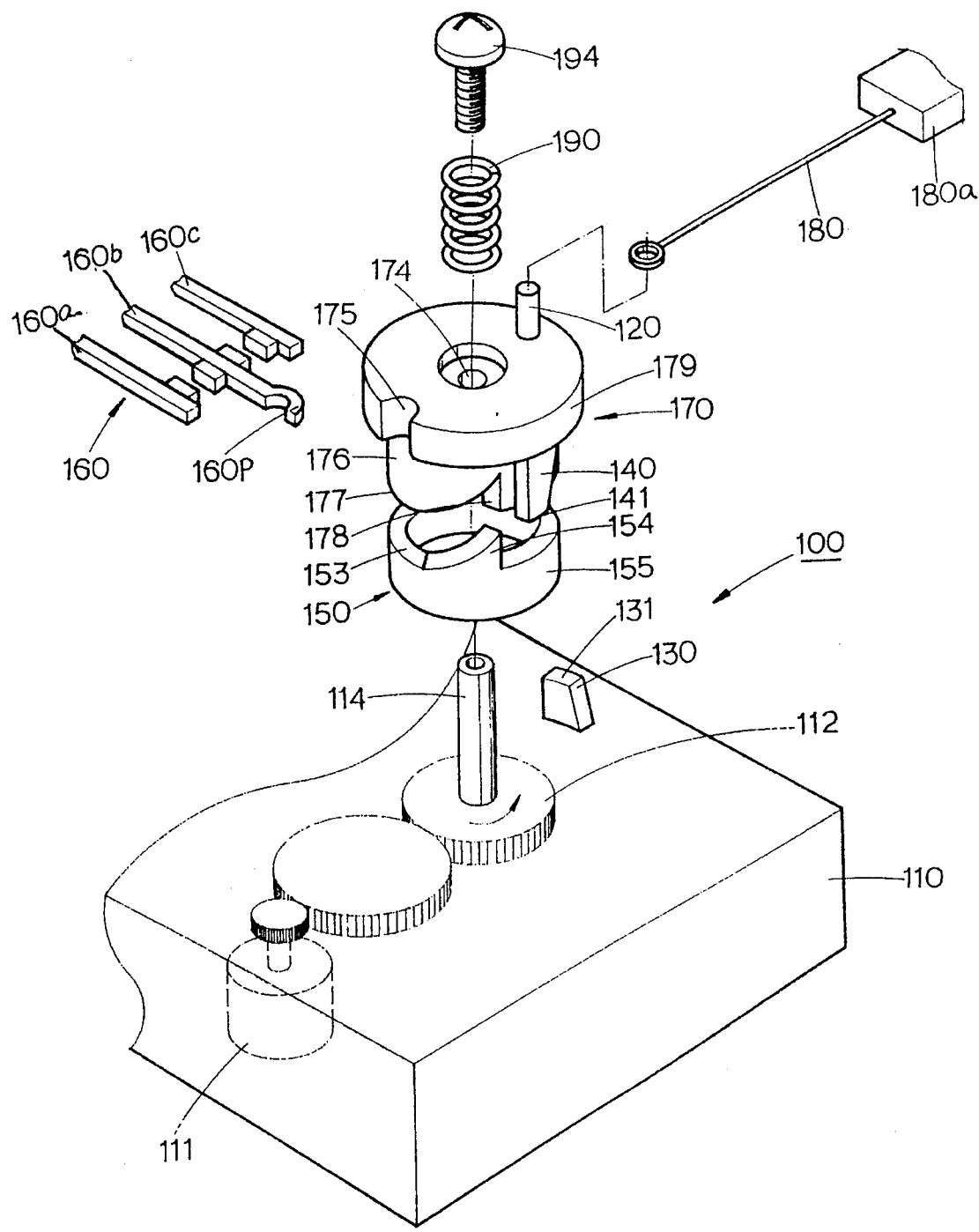
FIG. 1 is an exploded perspective view of the drainage apparatus of a clothes washing machine according to the present invention.

A drainage motor member of the present invention comprises a casing 110 housing a motor 111 which is a driving source as shown in FIG. 1. At the upper surface of the casing 110, a rotating shaft 114 receives the rotating force of a driven gear 112 connected to the motor 111. The force is transmitted to a first rotating member 150. The first rotating member 150 is assembled to the rotating shaft 114 so that the first rotating member 150 can rotate with the rotation of the rotating shaft 114 at the same time. The rotating shaft 114 is upwardly extended through an opening (not shown) of the first rotating member 150. A second rotating member 170 is free-rotatingly assembled to the rotating shaft 114. On the upper surface of the second rotating member 170 a spring 190 is disposed for always forcedly biasing the second rotating member 170 toward the first rotating member 150. A screw 194 is assembled to the rotating shaft 114 which is free-rotating in the opening 174 of the second rotating member 170, so that the spring 190 is always in a compressed state.

A male bevel jaw 154 is formed at the upper edge 153 of the cylindrical first rotating member 150. At the lower edge 177 of the cylindrical second rotating member 170 a groove 178 is formed for interconnecting to the male bevel jaw 154. In this embodiment, since the rotation direction of the shaft 114 is arranged counterclockwise, the bevel jaw 154 forms an axial shoulder on the right hand side, whilst the groove 178 is cut out to form an axial abutment surface on the right hand side. Thus, the first and second rotating members 150, 170 are rotated in the same direction as the rotation of the shaft 114.

Figure 5:
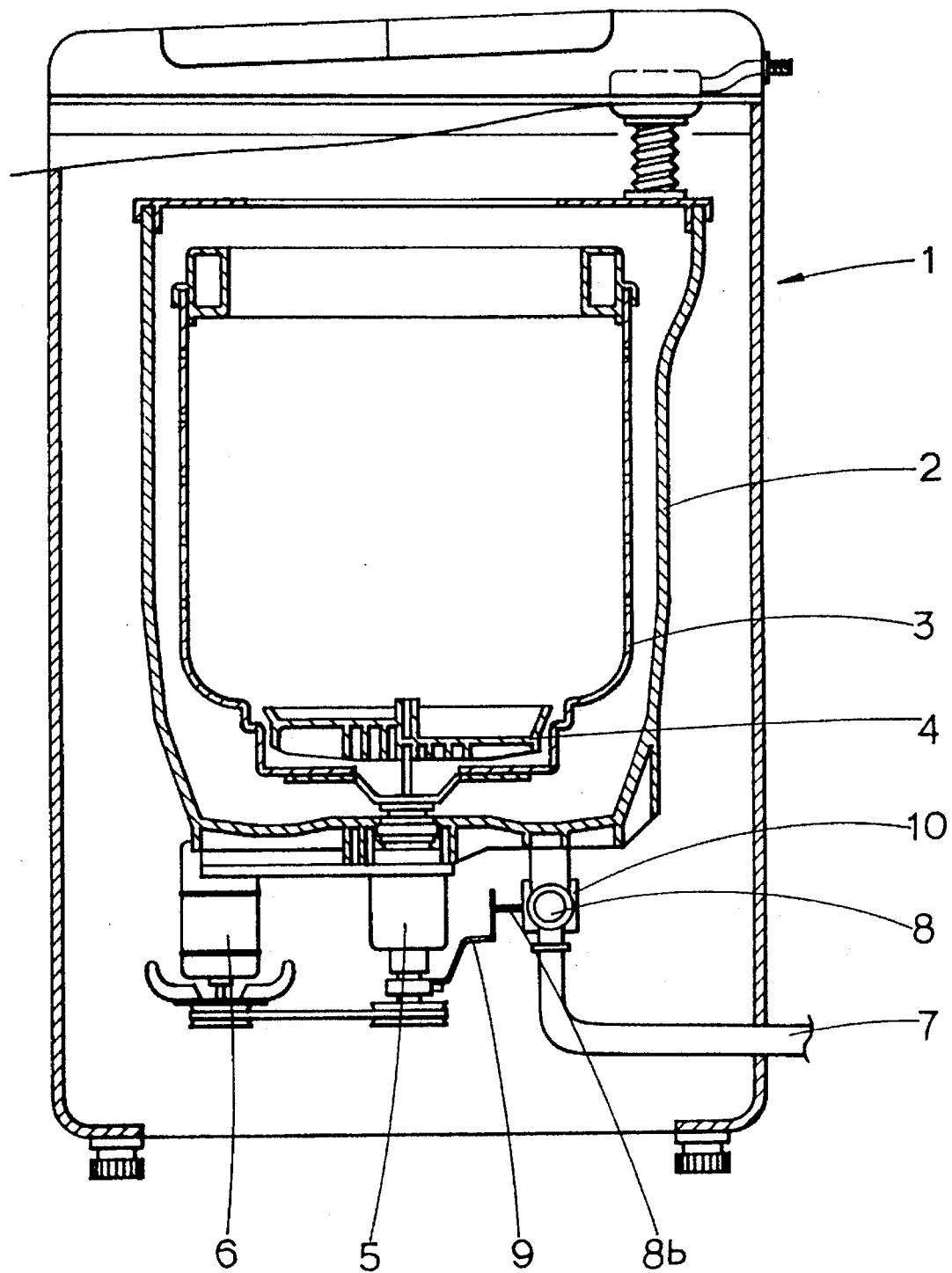
FIG. 5 is a side cross-sectional view of a clothes washing machine according to a prior art.
Figure 6:
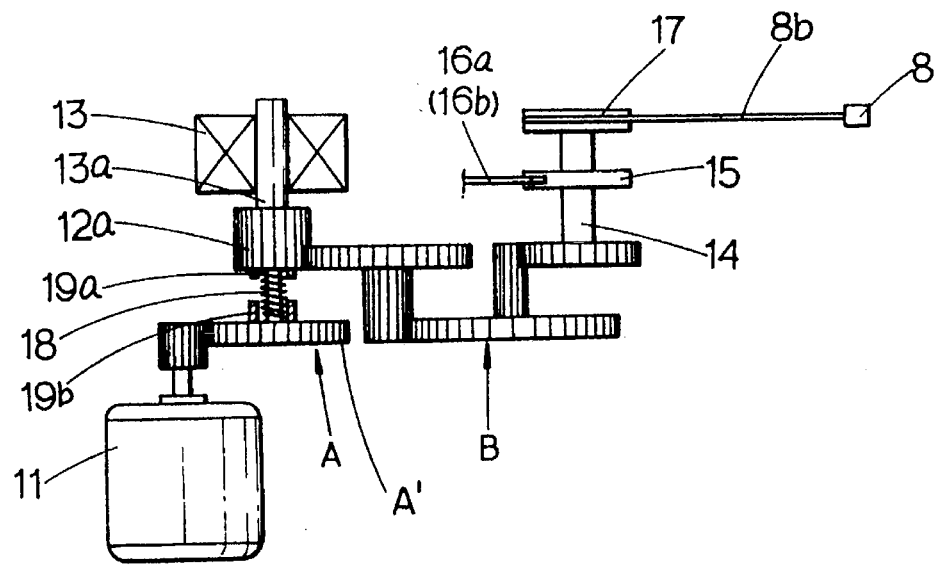
FIG. 6 is an engaged view of the components of the drainage apparatus shown in FIG. 5.
Figure 7A:
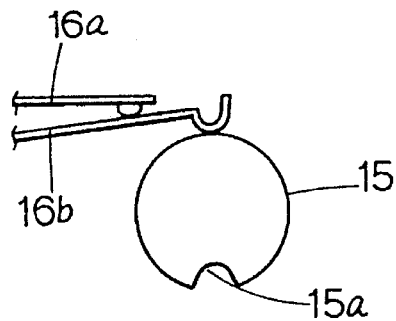
FIGS. 7A, 7B are operating views of the drainage apparatus of FIG. 6.
Figure 7B:
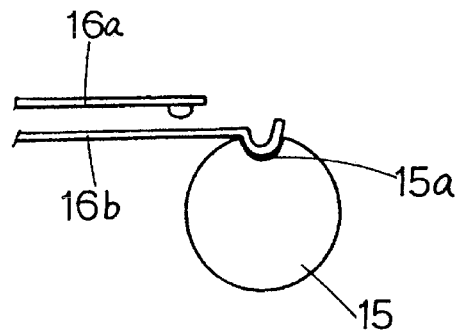

A projection 120 is formed on the upper surface of the second rotating member 170 adjacent to the circumference of the second rotating member 170. The projection 120 is connected to one end of a wire 180. Another end of the wire 180 is operatively connected to a drainage valve 180a which can drain the washing water in a water container of the type shown at 2 (FIG. 5). Tension is always applied to the wire 180 due to an elastic member (not shown) of the valve 180a.

A first cam 130 is formed on the upper surface of the casing 110 in spaced relationship to the circumferential surface of the first rotating member 150 at a predetermined distance therefrom. It is desired that the predetermined distance is such that the first rotating member 150 can meet a second cam 140 of the second rotating member 170 which will be explained later, after the rotation of the second rotating member 170. A flat upper end 131 of the first cam 130 lies in a plane perpendicular to the shaft 114. The height of the first cam 130 is the same or larger than the total height of the outer wall portion 155 of the first rotating member 150 and the bevel jaw 154.

In the second rotating member 170, the second cam 140 is disposed on a wall portion 176 which extends between a lower edge 177 and a flange 179 disposed at an upper end of the wall portion 176. The flange 179 has a groove 175 which will be explained later. The second cam 140 is extended in a reverse direction to the protruding direction of the first cam 130. The height of the second cam 140 is larger than that of the wall 176 of the second rotating member 170. Thus, the total height of the first and second cams 130, 140 is larger than the combined heights of the wall 176 of the second rotating member 170, and the wall 155 of the first rotating member 150 including the bevel jaw 154. So when the second rotating member 170 is axially disengaged from the first rotating member 150 by the action of the cams 130, 140 (to be described), the bevel jaw 154 of the first rotating member 150 will not obstruct rotation of the lower edge 177 of the second rotating member 170.

A groove 175 is formed on the outer circumference surface of the flange 179. The outer circumference surface of the flange 179 and the groove 175 enable electricity to be applied to or cut-off to the motor 111 as will be explained. The vertical (axial) width of the groove 175, and thus of the flange 179, is such that a flexible tip 160p of a switch member 160 (explained later) always makes contact in the groove 175 or on the circumference surface of the flange 179 even when the second rotating member 170 is axially engaged or disengaged with respect to the first rotating member 150. It is more desirable that the circumferentially spaced edges of the groove 175 are smoothly shaped, thereby enabling the flexible tip 160p of the switch member 160 to be easily inserted or extracted relative thereto.

The switch member 160 comprises first, second and third switch leads 160a, 160b, 160c, and is arranged parallel to the flange 179 of the second rotating member 170. The tip 160p of the second switch lead 160b is U-shaped corresponding to the shape of the groove 175 of the second rotating member 170. As elastic character is given to the second switch lead 160b so that the second switch lead 160b contacts the third switch lead 160c (FIG. 3B) when the flexible tip 160p is housed in the groove 175.

More, the second switch lead 160b contacts the first switch lead 160a (FIG. 2B) while the tip 160p of the second switch lead 160b is slidingly contacted on the outer circumferential surface of the flange 179.

Figure 2A:
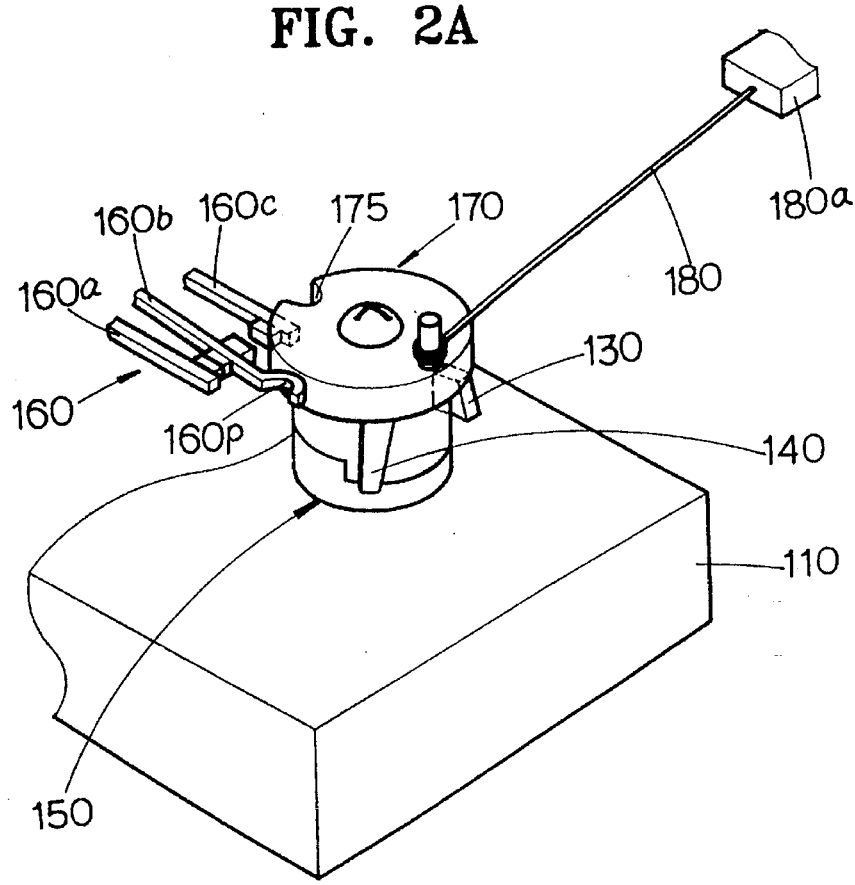
FIGS. 2A, 2B are operating views of the drainage apparatus of a clothes washing machine in an initial mode.
Figure 2B:
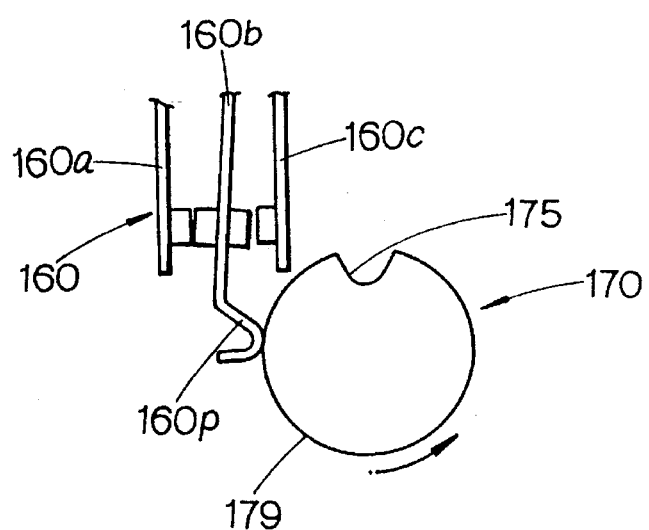

The drainage apparatus of a clothes washing machine, having the construction as described above, is operated as follows. FIGS. 2A, 2B depict the initial operation state of the drainage apparatus. The groove 178 of the second rotating member 170 meshes with the bevel jaw 154 of the first rotating member 150 by the expansion force of the spring 190 (FIG. 1) pressing against the upper surface of the second rotating member 170. The second switch lead 160b contacts the first switch lead 160a while the tip 160p of the second switch lead 160b contacts the outer circumferential surface of the flange 179. The second cam 140 is spaced ahead of the front portion of the second cam 130 by a predetermined distance. The drainage motor 111 (FIG. 1) rotates when electricity is applied across the first and the second leads 160a, 160b.

Figure 3A:
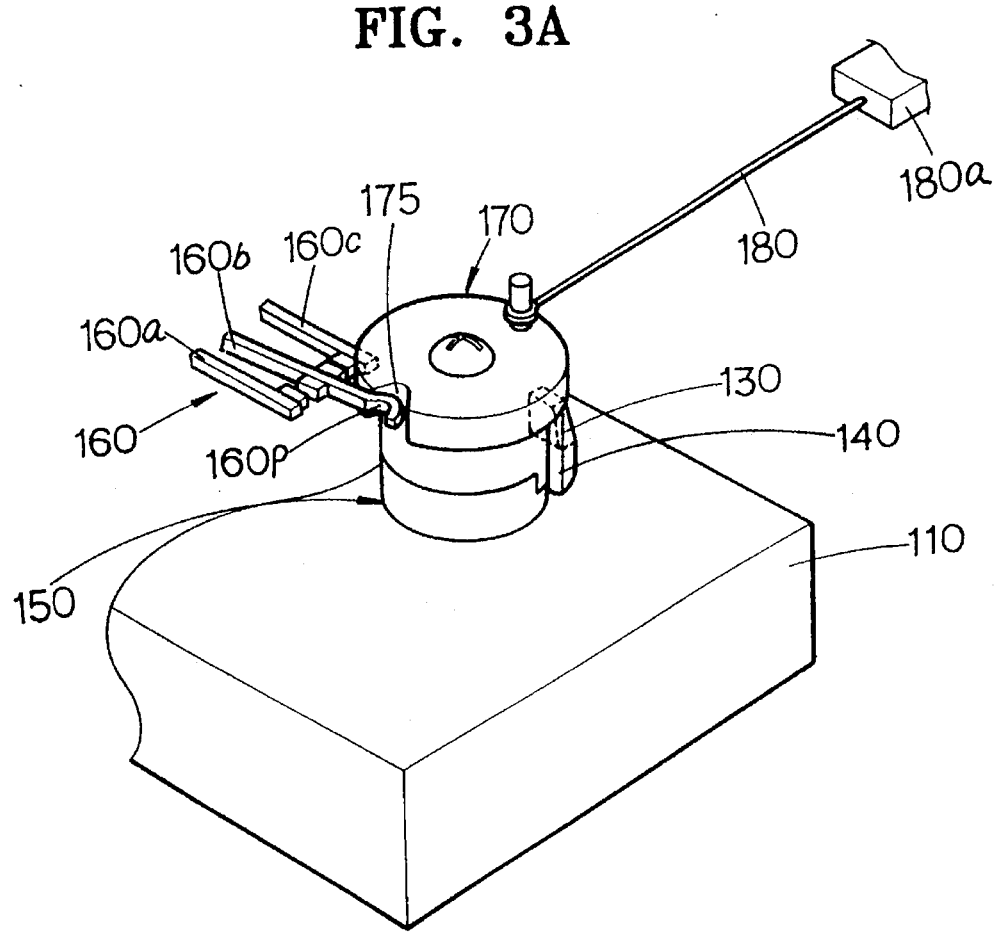
FIGS. 3A, 3B are operating views of the drainage apparatus of a clothes washing machine when in a drain mode.
Figure 3B:
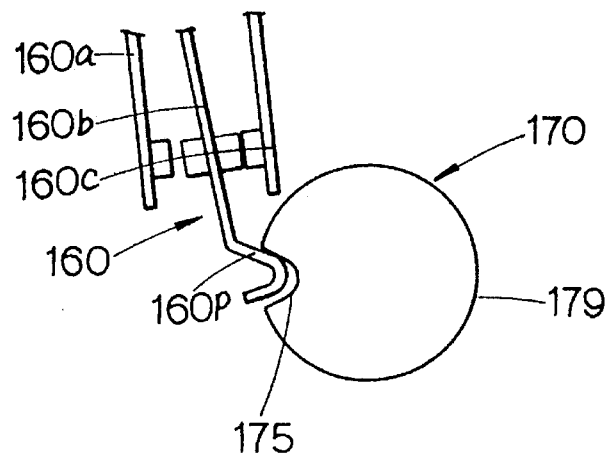

FIGS. 3A, 3B depict the actuation of the drainage apparatus. As the shaft 114 (FIG. 1) rotates with the rotation of the motor (FIG. 1), the first and the second rotating members 150, 170 are rotated counterclockwise, simultaneously. The projection 120 pulls the wire 180 toward the second rotating member 170 during the rotation of the second rotating member 170. Due to the movement of the wire 180, the drainage valve 180a, is opened, enabling water to be drained through the hose 7.

Eventually, during the counterclockwise rotation of the second rotating member 170, the groove 175 is moved into alignment with the tip 160p of the second switch lead 160b, and the tip 160p is inserted in the groove 175 in response to the flexing of the lead 160b. Simultaneously the second switch lead 160b contacts the third switch 160c. This signals a control mechanism to terminate the electrical supply to the motor 111 (FIG. 1), but the tension on the wire 180 is maintained, because engagement of the abutment surface of the groove 178 against the shoulder 154 prevents the second rotating member 170 from rotating backwards (i.e., from rotating clockwise in FIGS. 3A, 3B). Thus, the washing water is drained from the water container through the opened drainage valve 180a.

After a predetermined time of the drainage process, a control mechanism reapplies electricity to the motor 111 (FIG. 1) which restarts.

Figure 4:
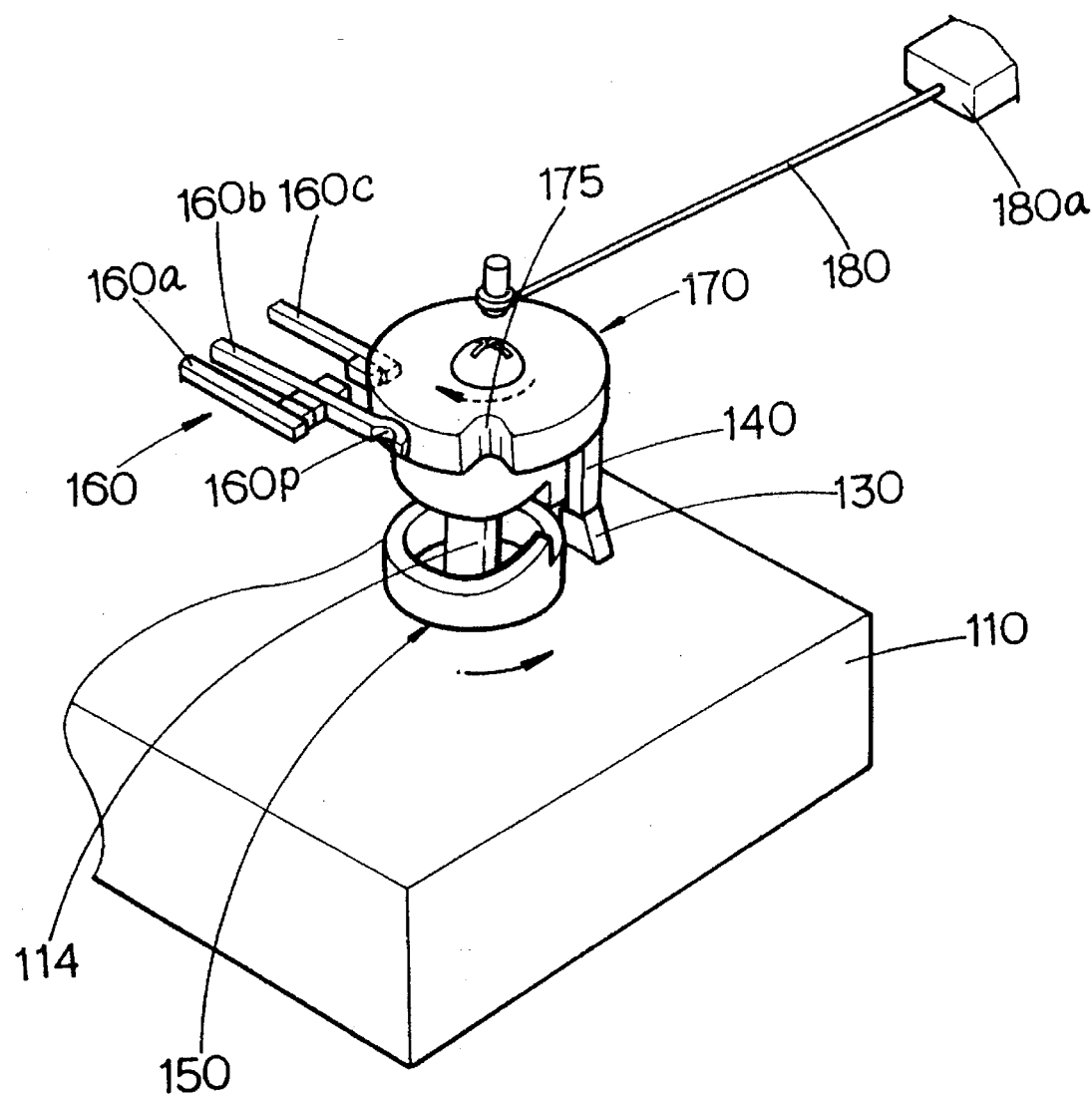
FIG. 4 is an operating view of the drainage apparatus of a clothes washing machine when in the drain finished mode.

The first and second rotating members 150, 170 then rotate in the same counterclockwise direction (solid arrow of FIG. 4), and the second cam 140 of the second rotating member 170 advances toward the first cam 130 disposed on the upper surface of the casing 110. As the rotation of the first and the second rotating members 150, 170 continues, a lower edge 141 of the second cam 140 contacts the first cam 130 and moves upward therealong and reaches the upper end 131 of the first cam 130. As the second cam 140 is moved upward, the second rotating member 170 is also moved upward against the force of the spring 190 (FIG. 1). The groove 178 of the second rotating member 170 is thus disengaged from the bevel jaw 154 of the first rotating member 150. Thus, the second rotating member 170 is free from the driving force of the first rotating member 150 while rotating in a reverse (clockwise) direction (see the broken-line arrow of FIG. 4) opposite to the rotation direction of the first rotating member 150. The reverse-rotation of the second rotating member 170 is produced by the wire 180 being pulled toward the drainage valve 180a by the tension of the spring (not shown) of the valve 180a.

As the second rotating member 170 is reverse-rotated (broken-line arrow), the second cam 140 travels off the first cam 130. The second rotating member 170 is then moved downward toward the first rotating member 150 by the spring 190 (FIG. 1). Simultaneously, the tip 160p of the second switch lead 160b moves out of the groove 175, and makes contact on the circumferential surface of the flange 179 of the second rotating member 170. The second switch lead 160b thus contacts the first switch lead 160a, and the second rotating member 170 is meshed with the first rotating member 150, which is the initial condition shown in FIG. 2B, i.e., a standby condition awaiting the next drainage process.

The drainage apparatus of a clothes washing machine according to the present invention provides a simple structural contact switch in lieu of the solenoid having the high possibility of cutting-off of the solenoid wire, thereby enabling the reliability of the apparatus to be increased.

What is claimed:

1. A water drainage apparatus for a clothes washer, comprising:

a drain valve;

an electric motor;

a shaft rotatable by said motor in a first direction about an axis;

a first rotatable member connected to said shaft for rotation thereby in said first direction about said axis;

a second rotatable member releasably connectible with said first rotatable member to be rotated in said first direction by a rotary force of said first rotatable member;

a connecting member connecting said second rotatable element to said drain valve and movable to a drain valve-opening position in response to rotation of said second rotatable member to a drain opening position by said first rotatable member;

an electric switch operably connected to said second rotatable member to be actuated thereby when said second rotatable member reaches said drain valve-opening position to temporarily deactivate said motor for a predetermined time period, whereafter said motor is reactivated to effect further rotation of said first and second rotatable members in said direction; and a disengaging mechanism for disengaging said second rotatable member from said first rotatable member during said further rotation, to enable said second rotatable member to rotate relative to said first rotatable member in a direction opposite said first rotatable member to close said drain valve.

2. The apparatus according to claim 1 wherein said disengagement mechanism disengages said second rotatable member from said first rotatable member in a direction coinciding with said axis.

3. The apparatus according to claim 1 wherein said disengaging mechanism comprises a fixed first cam, and a second cam rotatable with said second rotatable member along a path for contacting said fixed first cam.

4. The apparatus according to claim 1 including a biasing member for yieldably biasing said first and second rotatable members into mutual engagement.

5. The apparatus according to claim 4 wherein said biasing member comprises a spring.

6. The apparatus according to claim 1 wherein said switch comprises first, second, and third leads, said second lead being elastically flexible and engageable with said third lead when said second rotatable member reaches said drain-opening position, for temporarily deactivating said motor, said second lead being engageable with said first lead when said second rotatable member is out of said drain-opening position.

7. The apparatus according to claim 1 wherein said first and second rotatable members are engageable by a jaw-and-groove clutch connection.

8. The apparatus according to claim 6 wherein said second rotatable member includes an outer circumferential surface including a groove formed therein, said second lead contacting said first lead while out of engagement with said groove, and contacting said third lead while engaging said groove.

* * * * *